United States Patent [19]

Dubois et al.

[11] 4,411,130
[45] Oct. 25, 1983

[54] HEAD FOR THE SIMULTANEOUS LAYING OF OPTICAL FIBERS WITHIN A GROOVED CYLINDRICAL SUPPORT

[75] Inventors: Gilles Dubois; Jean P. Hulin, both of Conflans Sainte Honorine, France

[73] Assignee: Lignes Telegraphiques et Telephoniques, Conflans-Ste. Honorine, France

[21] Appl. No.: 347,255

[22] Filed: Feb. 9, 1982

[30] Foreign Application Priority Data

Feb. 17, 1981 [FR] France ............................. 81 03062

[51] Int. Cl.³ .................... D07B 5/00; D01H 13/04
[52] U.S. Cl. ..................................... 57/352; 57/6; 57/13; 57/264; 57/361
[58] Field of Search ................ 57/3, 6, 9, 11, 13, 57/17, 18, 264, 293, 311, 352, 361

[56] References Cited

U.S. PATENT DOCUMENTS

| | | | |
|---|---|---|---|
| 4,112,660 | 9/1978 | Ferrentino et al. | 57/352 X |
| 4,154,049 | 5/1979 | King et al. | 57/9 |
| 4,195,468 | 4/1980 | King et al. | 57/352 X |
| 4,205,899 | 6/1980 | King et al. | 57/9 X |
| 4,237,687 | 12/1980 | Vecchis et al. | 57/361 |
| 4,309,864 | 1/1982 | Hulin | 57/6 |
| 4,309,866 | 1/1982 | Fombellida | 57/352 X |
| 4,325,212 | 4/1982 | Hope | 57/9 X |

FOREIGN PATENT DOCUMENTS

| | | |
|---|---|---|
| 3930 | 9/1979 | European Pat. Off. |
| 20189 | 12/1980 | European Pat. Off. |
| 1544690 | 4/1979 | United Kingdom |
| 2022644 | 12/1979 | United Kingdom |
| 2023060 | 12/1979 | United Kingdom |

*Primary Examiner*—Donald Watkins
*Attorney, Agent, or Firm*—Roland Plottel

[57] ABSTRACT

A head for the simultaneous laying of optical fibers within a grooved cylindrical support rod comprises a hollow tube through which the support rod is capable of passing longitudinally, a draw-ring rigidly fixed to and in axial alignment with the tube. A central opening of the draw-ring has an internal flange provided with radial projecting portions each adapted to rest on the bottom of one groove of the support rod. A member for inserting the optical fibers within the grooves of the support rod has a central opening which is in alignment with the central opening of the draw-ring and through which the support rod is displaceable in continuous translational motion.

10 Claims, 3 Drawing Figures

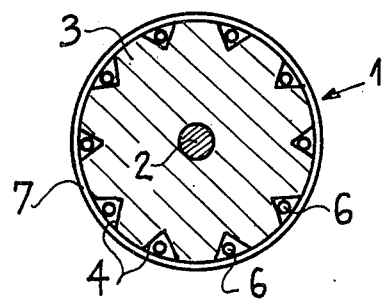
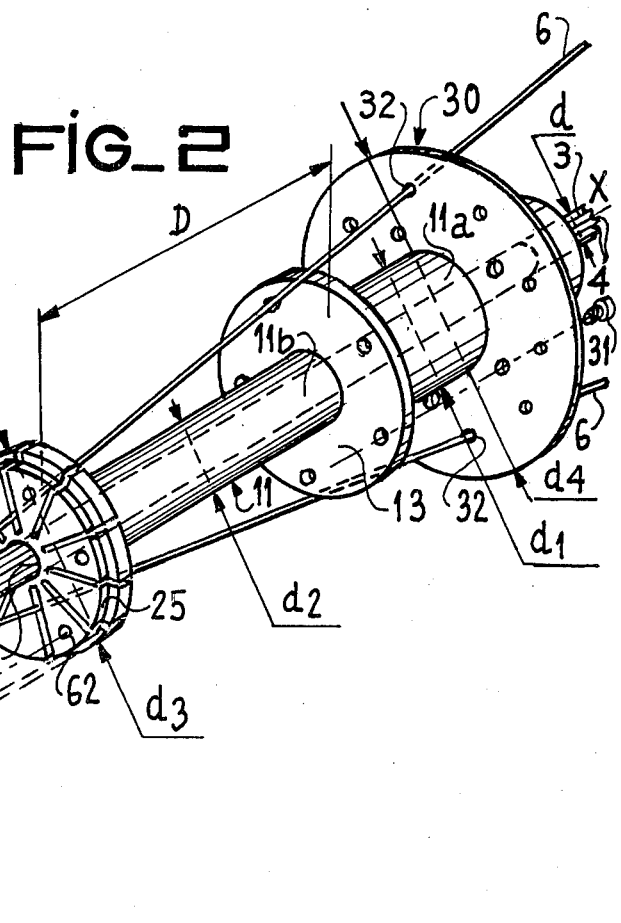

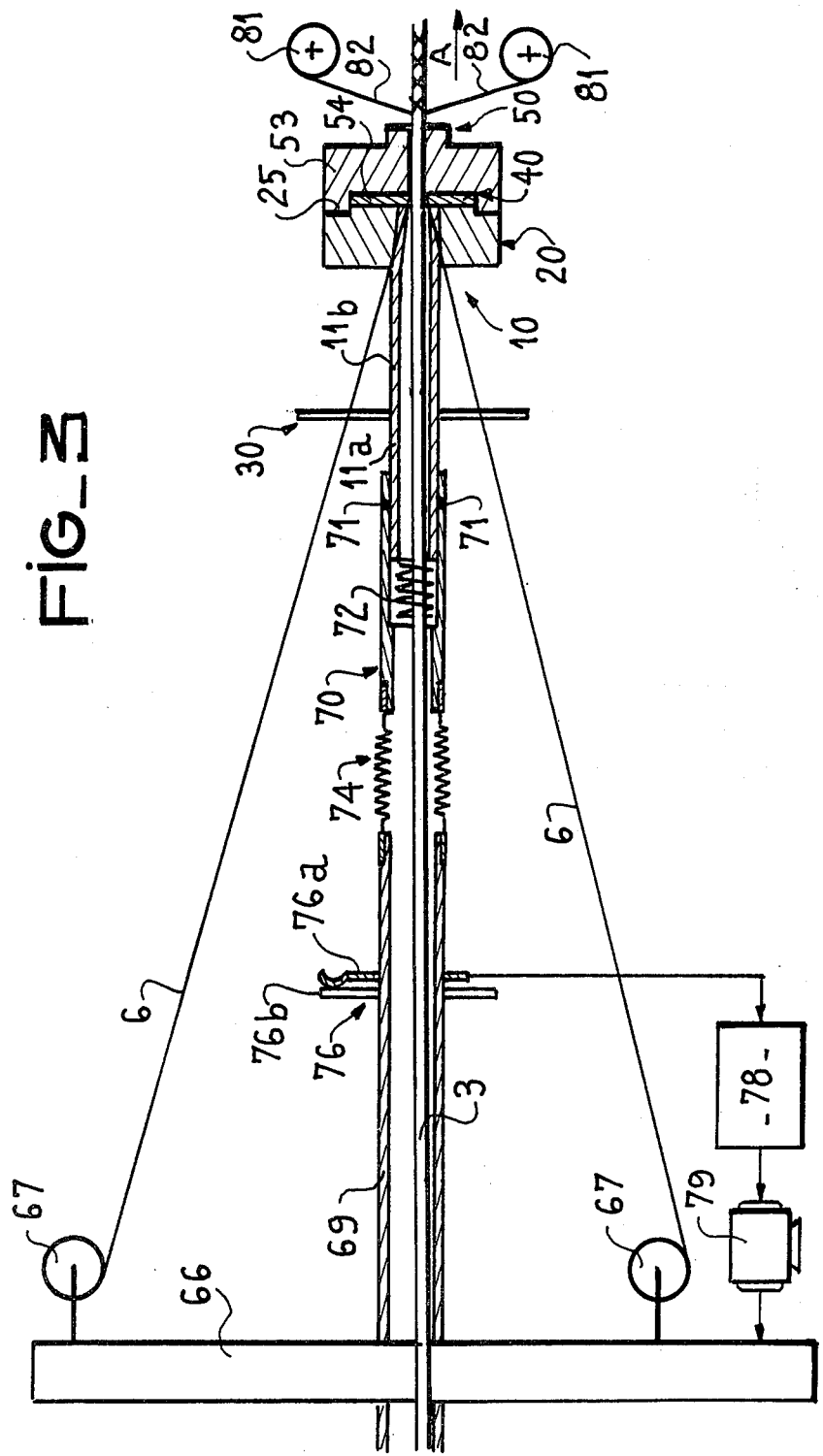

HEAD FOR THE SIMULTANEOUS LAYING OF OPTICAL FIBERS WITHIN A GROOVED CYLINDRICAL SUPPORT

The present invention generally relates to the fabrication of cable elements each comprising a cylindrical dielectric support beneath a protective jacket, the support being reinforced along its axis and recessed so as to form grooves which may be helical, for example, and have either a simple or alternate twist, one or a number of optical fibers being housed within each groove. More specifically, however, the invention is concerned with a head for simultaneous laying of optical fibers within a grooved cylindrical support which is displaced in translational motion.

Devices for simultaneous laying of an optical fiber within each groove of a cylindrical support while this latter is being displaced in continuous motion are already known. Reference can be made, for example, to U.S. Pat. No. 4,237,687 granted to the Assignee on Dec. 9th, 1980 and to U.S. patent application Ser. No. 148,689 filed on May 12th, 1980 now U.S. Pat. No. 4,237,687 by the Assignee. As described in these documents, the fiber-laying head is rotatably mounted on a shaft and comprises resilient fiber guides having the shape of needles each traversed by one optical fiber. Said guides each have a tapered end applied on the bottom of each groove of the cylindrical support during its displacement in translational motion and are maintained in rigidly fixed relation to a mounting frame which is driven in rotation.

However, a fiber-laying head of the type described in the foregoing is attended by drawbacks. There is in fact a risk that an optical fiber may not come into position exactly within the corresponding groove as it leaves its guide, with the result that the fiber comes out of its groove. It may also happen that, while it is being guided, an optical fiber comes into position within a groove for which it had not normally been intended. Consequently it is not possible to guarantee perfect execution of the operation which consists of laying an optical fiber within each groove of the cylindrical support. A further drawback arises from the use of guides of relatively substantial length in that frictional contact may take place between an optical fiber and its guide and may even result in jamming of said fiber within the guide. It should be added that this fiber-laying head has a relatively complex structure, with the result that the cost of manufacture of the head is considerably increased.

The aim of this invention is to overcome these disadvantages by proposing a head which proves wholly satisfactory for the purpose of simultaneous laying of optical fibers within a grooved cylindrical support rod, which no longer makes use of the needle-type fiber guides according to the prior art and which is of simple structural design, is inexpensive, is of lightweight construction, and ensures easy laying of one or a number of fibers within each groove of the cylindrical support rod.

To this end, the invention relates to a head for the simultaneous laying of optical fibers within grooves formed in the periphery of a cylindrical support rod, comprising:

a hollow tube through which the support rod passes longitudinally in continuous motion;

a first member having the shape of a washer and a larger diameter than the tube, said member being rigidly fixed to and located in axial alignment with said tube, said support rod being permitted to pass through a central opening formed in said member; said central opening has an internal flange provided with radial projecting portions equal in number to the grooves of the support rod so that each projecting portion rests substantially at the bottom of a groove; said washer-shaped member is provided with radial slits formed in its periphery and spaced at the same angular intervals as the projecting portions of the flange, with the result that each optical fiber engages within one slit and is positioned with respect to one groove of said support rod;

a cylindrical member for inserting the optical fibers in the grooves of the support rod, said member being rigidly fixed to the washer-shaped member and pierced by a central opening which is located in alignment with the opening of the washer-shaped member and through which the support rod is permitted to pass, each fiber being applied by said inserting member within one groove of said support rod.

It is thus apparent that the grooved opening of the washer-type member will permit accurate positioning of each optical fiber with respect to its corresponding groove of the support rod. Furthermore, should an optical fiber escape from its groove, the fiber-inserting member will have the effect of re-inserting said fiber within its groove.

The invention is also directed to a device for the fabrication of cable elements comprising a fiber-laying head according to the invention. The distinguishing feature of the device lies in the fact that means are provided for controlling the angular positions of a rotatably mounted fiber-laying head with respect to a turntable which supports optical-fiber supply reels.

Other features of the invention will be more apparent upon consideration of the following description and accompanying drawings, wherein:

FIG. 1 is a view in cross-section showing a cable element fitted with optical fibers;

FIG. 2 is an exploded view in perspective showing the fiber-laying head according to the invention;

FIG. 3 is a longitudinal sectional view of the device for the fabrication of cable elements, the device being equipped with the fiber-laying head shown in FIG. 2.

In one embodiment which will now be described with reference to FIG. 1, a completed optical-fiber cable element designated by the reference numeral 1 has a central strengthening member or core 2 for rigidifying the cable and absorbing longitudinal stresses. Around said central core is placed a cylindrical dielectric support rod 3 in which are formed grooves 4. By way of example, provision can be made for ten helical grooves having either a simple or alternate twist and a fairly long pitch compared with the diameter of the support rod. The grooves 4, which have a V-shaped profile, for example, are uniformly distributed on the external surface of the support rod 3. At least one optical fiber 6 is inserted or housed within each groove 4 and the protective jacket 7 of the cable 1 is shown at 7.

The operation which consists in fitting the optical fibers 6 simultaneously within the grooves 4 of the cylindrical support rod as this latter is displaced in translational motion is carried out by the fiber-laying head according to the invention, as shown in FIG. 2 and described hereunder.

The fiber-laying head is generally designated by the reference numeral 10 and comprises a hollow tube 11 having an axis X—X' and formed of aluminum, for example. The cylindrical support rod 3 is provided, for example, with ten helical grooves 4 having a simple twist and is passed longitudinally through said hollow tube 11. Said grooved support rod 3 is displaced continuously in the direction of the arrow A as shown in FIG. 2. The tube 11 is constituted by a first cylindrical element 11a having a diameter $d_1$ and extended by a second cylindrical element 11b having a diameter $d_2$ which is smaller than $d_1$ and substantially larger than the diameter d of the support rod 3.

The tube 11 terminates in a first cylindrical draw-ring 20 formed, for example of a metal such as aluminum, having the same axis X—X' as the tube 11, and having the intended function of centering the grooved cylindrical support rod 3. Said centering draw-ring 20 has the shape of a washer, has a diameter $d_3$ which is larger than the diameter of the tube 11, and constitutes a single piece with the tube element 11b.

The centering member 20 has a central opening 21 substantially equal in diameter to the cylindrical support rod 3 and permitting the insertion of this latter. Said centering member is provided with a plurality of radial slits 23 formed in the periphery of this latter and equal in number to the grooves 4 of the support rod 3 (ten slits in the example chosen), said slits being spaced at the same angular intervals as said grooves of the cylindrical support rod 3. Each slit 23 of the member 20 has a width which is substantially larger than the diameter of the optical fibers 6 and is cut from the periphery of said member to a point in the vicinity of the central opening 21.

The centering member 20 is further provided with a circular shoulder 25 in which are formed the same radial slits 23.

An annular member forming a support 13 is mounted externally on the tube 11, and more precisely at the level of the junction of the two tube elements 11a and 11b. A member 30 having the shape of a washer and having the function of a draw-ring is applied against said annular support 13. Said member 30 is formed, for example, of Teflon or of burnished steel, has a diameter $d_4$ which is larger than that of the centering member 20, and is located at a distance D from said centering member.

Said draw-ring member 30 is rigidly fixed to the annular support member 13 by attachment means such as screws 31, for example.

The draw-ring member 30 is pierced by holes 32 located at intervals on the periphery of said member and having the same angular spacing as the slits 23 of the centering member 20. Thus the optical fibers 6 penetrate into their respective holes 32 of the draw-ring 30 and are pre-positioned angularly, then converge in a conical cluster towards the draw-ring member 20 and engage in the corresponding slits 23.

A point worthy of note is that the holes 32 can advantageously be replaced by radial grooves which terminate in a rounded portion forming a housing. In fact, when grooves of this type are adopted, the operator can easily load the draw-ring 30 with optical fibers in a very short time.

The fiber-laying head 10 is also provided with a third washer-type draw-ring 40 of steel, for example, which has the same diameter as the circular shoulder 25 of the centering draw-ring 20 and is intended to be applied against said shoulder 25.

The draw-ring 40 is provided with a central opening 41 having the same diameter as the grooved cylindrical support rod 3 and located in alignment with the opening 21 of the draw-ring 20. The opening 41 has an internal flange provided with radial projecting portions 43 which may be V-shaped, for example, and the number of which is equal to the number of grooves 4 of the cylindrical support rod 3 (namely ten grooves in the example chosen), with the result that each projecting portion 43 rests on the bottom of one groove 4 of the cylindrical support rod.

The draw-ring 40 is also provided with radial slits 44 which are identical with those of the draw-ring 20. Said slits 44 are spaced at the same angular intervals as the V-shaped projecting portions 43 of the opening 41 and at the same angular intervals as the slits 23 of the draw-ring 20. Thus, at the exit of the draw-ring 20, each optical fiber 6 engages within a radial slit 44 of the draw-ring 40 and comes into position with respect to its corresponding groove 4 of the cylindrical support rod 3. The draw-ring 40 therefore performs the function of a guide for positioning the optical fibers with respect to the grooves of the cylindrical support rod.

The fiber-laying head 10 is additionally provided with a fourth cylindrical draw-ring 50 formed of steel, for example, and having a diameter which is substantially larger than that of the grooved cylindrical support rod 3. Said cylindrical draw-ring is provided with a central opening 51 which is located in alignment with the openings of the draw-rings aforementioned and through which the cylindrical support rod 3 is permitted to pass. The draw-ring 50 is rigidly fixed to a member forming an annular end-fitting 53 and provided with a housing 54 for accommodating the positioning ring 40.

In order to carry out the assembly of the three draw-rings 20, 40 and 50, the draw-ring 40 is first placed in position within the housing 54 of the end-fitting 53. Said ring 40 is then applied against the circular shoulder 25 of the ring 20 against which the end-fitting 53 can thus be abuttingly applied. The three draw-rings are then rigidly fixed to each other by suitable fastening means such as, for example, screws 61 engaged within corresponding bores 62 formed in each of the three draw-rings. From this stage onwards, the three draw-rings constitute a rigid unitary assembly.

After positioning of each optical fiber 6 with respect to a groove 4 of the support rod 3, the cylindrical draw-ring 50 effects the insertion or laying of each fiber within the corresponding groove of the support rod 3. Immediately at the point of exit from the draw-ring 50, each optical fiber 6 is maintained in position within its groove 4 by means of a protective jacket (not shown in the drawings) which covers the support rod 3 progressively as this latter is displaced in translational motion.

It will be noted that the two draw-rings 40 and 50 can each be designed in the form of a plurality of separable elements. This has the advantage of permitting ready access to an optical fiber in order to carry out such operations as cleaning of the fiber.

The fiber-laying head according to the invention has been described in the foregoing with reference to a cylindrical support rod in which ten grooves have been cut, one optical fiber being housed within each groove. It will readily be apparent that the number of grooves as well as the number of fibers per groove are not given in any sense by way of limitation. In particular, the Assignee has employed a cylindrical support rod having twelve grooves and three optical fibers fitted within each groove as a result of the operation of the fiber-laying head according to the invention.

FIG. 3 is a sectional view showing the device for the fabrication of cable elements and incorporating the rotatably mounted fiber-laying head according to the invention. In this figure, the same reference numerals are employed to designate elements which are identical with those of FIG. 2. The reference numeral 66 designates a turntable which is driven in rotation at the rate of one revolution per pitch of the grooves of the cylindrical support rod 3 which is displaced in translational motion. The optical fibers 6 are delivered by reels 67 mounted on the turntable 66 and are oriented in a conical cluster towards the fiber-laying head 10. A hollow tubular shaft 69 is mounted in rigidly fixed relation to the turntable 66 in such a manner as to pass through this latter and to permit translational displacement of the grooved cylindrical support rod 3 which is fed from a reserve supply (not shown in the drawings).

It is apparent from FIG. 3 that the fiber-laying head 10 is maintained in position by locking means constituted for example by a bayonet coupling system 70 mounted on one end of the tube 11. The two lugs 71 of the bayonet coupling system are mounted dissymmetrically on the tube element 11a in order to perform an error-preventing function, thus permitting rapid and accurate positioning of the fiber-laying head. At the time of locking of the fiber-laying head, the end face of the tube 11 is intended to compress a spring 72 mounted within the bayonet coupling system 70.

Between the tubular shaft 69 and the locking system 70 are stationarily mounted flexible coupling means consisting of a bronze bellows element, for example, said means being intended to compensate for any possible variations in the position of the cylindrical support rod 3 and especially angular displacements of said support rod.

The fabrication line also comprises a servo-control system for fixing the angular position of the fiber-laying head 10 with respect to the turntable 66. Said system comprises a pickup consisting, for example, of a potentiometer 76 designed in the form of a slider 76a which is rigidly fixed to the tubular shaft 69 and capable of moving along a conductive track 76b provided with a position-setting or reference element for subsequent restarting of the fabrication device. It will be noted that the potentiometer 76 can be of the double track type or may be replaced by any type of sensor such as an optical pickup, for example.

The pickup 76 delivers at its output a signal for supplying current to a processing unit 78, the function of said unit being to control the angular setting of the turntable 66 by means of a motor 79 which is coupled to the turntable 66 through a gear system (not shown in the drawings).

At the exit of the fiber-laying head 10, there is shown at 81 a device for applying a first protective jacket 82 for maintaining the optical fibers 6 within the grooves 4 of the cylindrical support rod 3. The cable element is then completed by fitting a second protective jacket or outer cladding sheath (not shown in the drawings).

What is claimed is:

1. A head for the simultaneous laying of optical fibers within grooves formed in the periphery of a cylindrical support rod, comprising:
   a hollow tube through which the support rod passes longitudinally in continuous motion;
   a first member having the shape of a washer and a larger diameter than the tube, said member being rigidly fixed to and located in alignment with said tube, said support rod being permitted to pass through a central opening formed in said member, said central opening being provided with an internal flange having radial projecting portions equal in number to the grooves of the support rod so that each projecting portion rests substantially at the bottom of a groove, said washer-shaped member being provided with radial slits formed in its periphery and spaced at the same angular intervals as the projecting portions of said flange, each optical fiber being thus caused to engage within one slit and positioned with respect to one groove of said support rod;
   a cylindrical member for inserting the optical fibers in the grooves of the support rod, said cylindrical member being rigidly fixed to the washer-shaped member and pierced by a central opening which is located in alignment with the opening of said washer-shaped member and through which said support rod is permitted to pass, each fiber being applied by said inserting member within one groove of said support rod.

2. A fiber-laying head according to claim 1, wherein said head further comprises a cylindrical member having the function of centering the support rod and having a larger diameter than the tube, said cylindrical member being mounted coaxially on one of the terminal faces of the tube and provided with a central opening which is aligned with the central openings of the two members aforesaid and through which the support rod is permitted to pass, the periphery of said cylindrical centering member being provided with radial slits which are spaced at the same angular intervals as the slits of the washer-shaped member and in which the optical fibers are capable of engaging, the washer-shaped member being mounted so as to bear on the face of the centering member remote from the face which is placed against the tube.

3. A fiber-laying head according to claim 1 or claim 2, wherein said head further comprises a second washer-shaped member fixed coaxially on the tube at a distance from the centering member and pierced by holes spaced on the periphery of said second member at substantially the same angular intervals as the slits of said centering member so that each optical fiber penetrates into one hole and is angularly pre-positioned.

4. A fiber-laying head according to claim 1, wherein the fiber-inserting member is rigidly fixed to an annular end-fitting provided with a housing for accommodating the first washer-shaped member.

5. A fiber-laying head according to claim 2, wherein the centering member has substantially the shape of a washer in which the radial slits aforesaid are formed, said centering member being provided with a circular shoulder against which the first washer-shaped member is applied.

6. A fiber-laying head according to claim 1, wherein said head comprises means for rigidly fixing the end-fitting to the centering member so as to ensure that the first washer-shaped member is placed within the housing of said end-fitting and that said centering member, said washer-shaped member and said end-fitting form a rigid unitary assembly.

7. A fiber-laying head according to claim 1, wherein the tube and the centering member form a one-piece unit and wherein the end-fitting and the fiber-inserting member also form a one-piece unit.

8. A device for the fabrication of cable elements, comprising:
    (a) a turntable for supporting optical-fiber supply reels;
    (b) a tubular shaft rigidly fixed to said turntable and within which a cable support rod is displaced in translational motion;
    (c) rotating fiber-laying head mechanically coupled to said tubular shaft;
    (d) means for locking said fiber-laying head with respect to said tubular shaft, said locking means being constituted by a bayonet coupling system having two lugs fixed dissymetrically on said fiber-laying head, said cable support rod passing longitudinally through said bayonet coupling system; and
    (e) means for controlling the angular positions of said fiber-laying head with respect to said turntable, said controlling means being coupled between said tubular shaft and said turntable.

9. A device as claimed in claim 8 further comprising flexible coupling means mounted in securely fixed relation between said bayonet coupling system and said tubular shaft, said cable support rod passing longitudinally through said coupling means.

10. A device as claimed in claim 8 wherein said controlling means comprise a pickup rigidly fixed to said tubular shaft and a motor controlled by said pickup for driving said turntable in rotation.

* * * * *